(No Model.)
C. BUTCHER.
TRUCK.
No. 455,653. Patented July 7, 1891.
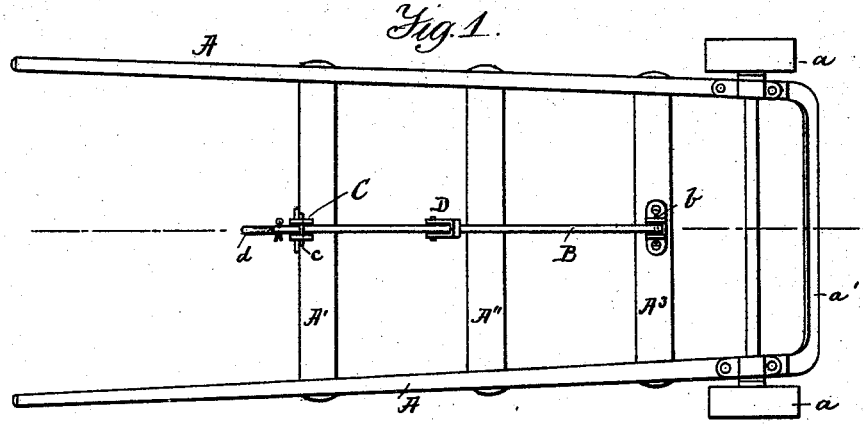
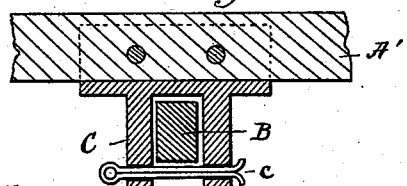
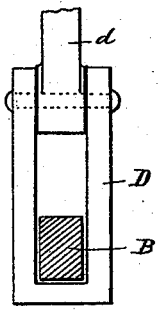
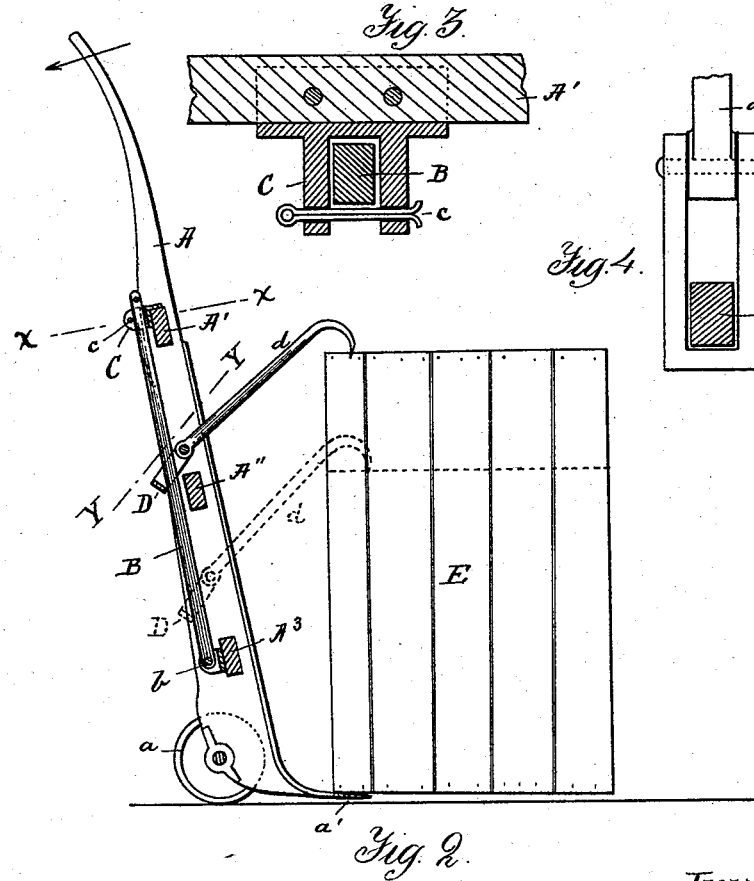
Witnesses
Thomas W. Holden
Alice A. Perkins
Inventor
Charles Butcher
by Alban Andrew
his atty.

UNITED STATES PATENT OFFICE.

CHARLES BUTCHER, OF CAMBRIDGE, MASSACHUSETTS.

TRUCK.

SPECIFICATION forming part of Letters Patent No. 455,653, dated July 7, 1891.

Application filed March 6, 1891. Serial No. 383,999. (No model.)

*To all whom it may concern:*

Be it known that I, CHARLES BUTCHER, a citizen of the United States, and a resident of Cambridge, in the county of Middlesex and State of Massachusetts, have invented new and useful Improvements in Cant-Hooks for Trucks, of which the following, taken in connection with the accompanying drawings, is a specification.

This invention relates to improvements in cant-hooks for trucks for the purpose of aiding the operator in loading heavy boxes, barrels, packages, &c., on the truck, as will hereinafter be more fully shown and described, reference being had to the accompanying drawings, wherein—

Figure 1 represents a rear view of a warehouse-truck provided with my improved cant-hook. Fig. 2 represents a longitudinal section of the same, showing the manner of using the cant-hook. Fig. 3 represents a detail section on the line X X, shown in Fig. 2; and Fig. 4 represents a detail section on the line Y Y, also shown in Fig. 2.

Similar letters refer to similar parts wherever they occur on the different parts of the drawings.

A represents an ordinary warehouse-truck having wheels or rollers $a\ a$, and upper, middle, and lower braces $A'$, $A''$, and $A^3$, as usual.

$a'$ is the lower metal-pointed end of the truck, as usual.

In connection with a truck of this or similar construction, I use my improved cant-hook device, which is constructed as follows: To one of the braces, preferably the lower one $A^3$, I pivot at $b$ on the rear of said brace a metal bar B, the free end of which is detachably secured to one of the braces, preferably, the upper one $A'$, as shown in Figs. 1 and 2.

In the drawings I have shown the device for securing the upper end of the pivoted bar B in a detachable manner to the brace $A'$ as consisting of a forked metal bracket C, secured to the rear of the said brace $A'$ and adapted to receive the upper end of the said bar B, which latter is secured to the piece C by means of a locking-pin $c$ going through perforations in the forks of the bracket C, as shown in Figs. 1, 2, and 3. I do not wish to confine myself to this precise locking device for the bar B, for any suitable catch or latch may be used to equal advantage without departing from the essence of my invention.

On the bar B is longitudinally adjustable a block or strap D, which is preferably made forked or V-shaped, and to the forward end of such strap is pivoted the cant-hook $d$, as shown in Figs. 1, 2, and 4.

E in Fig. 2 represents the box or package that is to be loaded on the truck.

In using the device the lower edge $a'$ of the truck is placed under the bottom of the package or case E, after which the cant-hook $d$ is hooked onto the upper part of such package, as shown in Fig. 2. The operator then turns the upper end of the truck in the direction of the arrow shown in Fig. 2, causing the package or box E to be easily tipped with the truck until it is automatically loaded thereon as the truck is swung more or less downward.

By this simple device a great and powerful leverage is obtained by which heavy cases and packages, barrels, &c., can be loaded easily upon trucks by a single operator without the need of reaching over and pulling by hand such packages, &c., onto the truck.

The position of the strap D on the bar B is regulated according to the size of the box or package that is to be loaded, as shown in dotted lines in Fig. 2—that is, for larger packages the strap D and its hook $d$ are located on the bar B between the upper and middle braces $A'$ $A''$, as shown in full lines in Fig. 2; for smaller packages said strap and hook are located on said bar between the middle and lower braces $A''$ $A^3$, as shown in dotted lines in said Fig. 2. To adjust the strap D and hook $d$ to and from such positions, it is only necessary to detach the upper end of the bar B from its locking device C and to swing it and the hook backward sufficiently to permit the hook to be moved out of the upper space and introduced into the lower one, or vice versa, as circumstances may require, after which the bar B is swung into its normal position and locked, as shown in full lines in Figs. 1 and 2.

Having thus fully described the nature, construction, and operation of my invention, I wish to secure by Letters Patent and claim—

The combination, with a warehouse-truck having transverse braces connecting its side pieces, of a longitudinal bar pivoted at one extremity to one of the transverse braces and detachably connected at its opposite extremity to another transverse brace, a block or strap adjustable along the length of the longitudinal bar, and a cant-hook pivoted to and movable with the block or strap, substantially as described.

In testimony whereof I have signed my name to this specification, in the presence of two subscribing witnesses, on this 5th day of March, A. D. 1891.

CHARLES BUTCHER.

Witnesses:
ALBAN ANDRÉN,
ALICE A. PERKINS.